United States Patent
Leyh

(10) Patent No.: US 7,667,991 B2
(45) Date of Patent: Feb. 23, 2010

(54) SINE WAVE LAMP CONTROLLER WITH ACTIVE SWITCH COMMUTATION AND ANTI-FLICKER CORRECTION

(75) Inventor: Gregory E. Leyh, Brisbane, CA (US)

(73) Assignee: Sinewave Energy Technologies, LLC, Conshohocken, PA (US)

( * ) Notice: Subject to any disclaimer, the term of this patent is extended or adjusted under 35 U.S.C. 154(b) by 0 days.

(21) Appl. No.: 11/780,318

(22) Filed: Jul. 19, 2007

(65) Prior Publication Data
US 2008/0067947 A1 Mar. 20, 2008

Related U.S. Application Data

(60) Provisional application No. 60/807,774, filed on Jul. 19, 2006.

(51) Int. Cl.
H02M 7/5387 (2007.01)
(52) U.S. Cl. .................. 363/132; 363/131; 363/17; 363/16; 363/71
(58) Field of Classification Search ............ 363/132, 363/131, 17, 16, 55, 56.01, 56.02, 65, 71
See application file for complete search history.

(56) References Cited

U.S. PATENT DOCUMENTS 6,072,707 A * 6/2000 Hochgraf ................. 363/71
2005/0105314 A1 * 5/2005 Nielsen ................. 363/132

* cited by examiner

*Primary Examiner*—Tuyet Vo
(74) *Attorney, Agent, or Firm*—Rudoler & DeRosa LLC

(57) ABSTRACT

A pulse width modulated half bridge dimming controller is provided for dimming a lighting ballast is described. The top half of the bridge is comprised of two switches, the top switch set, and the bottom half of the bridge is comprised of two switches, the bottom switch set. Each switch also has a diode in parallel with it. The drivers for the switches are configured so that each of the switches can be turned on and off independently of all of all the other switches. Preferably, the controller is capable of operating in all four quadrants. In one preferred embodiment the switches are IGBTs. The switches are controlled in a manner so that when one of the switches sets changes states, the second switch set has one switch on and one switch off, so that one of the diodes in the second switch set is disposed to block shoot through and provide a path to allow current to continue flowing in the inductive load.

11 Claims, 6 Drawing Sheets

US 7,667,991 B2

SINE WAVE LAMP CONTROLLER WITH ACTIVE SWITCH COMMUTATION AND ANTI-FLICKER CORRECTION

CROSS-REFERENCE TO RELATED APPLICATIONS

The present application claims the benefit of U.S. Provisional Application No. 60/807,774 filed on Jul. 19, 2006, which is incorporated herein by reference.

STATEMENT REGARDING FEDERALLY SPONSORED RESEARCH OR DEVELOPMENT

The present invention was not developed with the use of any Federal funds but was developed independently by the inventor.

BACKGROUND OF THE INVENTION

High Intensity Discharge (HID) lamps are widely used in airports, parking garages and on public streets to provide wide-area ambient lighting. Although recent electronic ballast designs can deliver better efficiency, improved power factor and longer bulb life than the standard magnetic ballast, most of the HID lamps currently in use employ magnetic ballasts, owing to their low cost, familiar characteristics and their decades-old domination of the HID and fluorescent lighting markets.

Given the ever increasing demands to improve energy efficiency of existing buildings and public structures, there is a strong, financial incentive to retrofit existing HID lighting installations with modern dimmable lighting systems. However, in many installation it is not economical to change out the existing light fixtures and ballasts, creating the need for a lighting controller that can reliably and accurately dim entire banks of existing magnetically ballasted HID lamps at the contactor control point.

Given that standard HID lamps and magnetic ballasts were not originally designed to be dimmable, this effort represents a complex engineering task. Several commercial examples have been developed to date, with varying degrees of success. Common problems with HID dimmers include flicker, line harmonics, poor power factor, reliability, and arc extinction during the dimming process.

A number of approaches have been taken to control the light intensity of a fluorescent lamp or a HID lamp. Some use pulse width modulation of an inverter drive, or change the supply voltage to the rectifying circuit for the inverter DC link voltage.

One approach uses a phase controlled dimmable ballast for a fluorescent lamp. A small portion of the phase of the input supply voltage is removed, and the amount of phase removed is used to generate a switching signal that controls the frequency of the electronic ballast and thus the light output.

In another version of an automatic light dimmer for gas discharge lamps, the apparatus applies full power to the primaries when the lights are first turned on for a pre-selected time period, thus ensuring all the lamps in the system are lit. After the pre-selected time period has passed, the apparatus automatically dims the lamps and maintains them in the dimmed state.

There are electronic ballasts with illumination control, such as U.S. Pat. No. 6,172,466 B1, known as phase-control dimmable ballast, which suppresses a portion of the supply voltage in each half cycle. This circuit interpolates the selected illumination level, adjusting conduction times in the solid-state switch element. This process affects the power factor of the ballast and contributes a degree of harmonic distortion to the power line. This system, which interacts with internal elements of the electronic ballast, cannot be built as an element that is external to the ballast because it requires structural changes in the system of common electronic ballasts.

Also well-known are the electronic ballasts that have a certain number of operating taps offered at their power terminals to set the lighting intensity. With this system, the different lighting taps can be wired to a multiple switch. The disadvantage is that the lighting changes suddenly and power cables must be added to the lighting circuit. The change in the illumination level is based on a circuit that, like the previous technique described, affects the conduction times in a solid-state switching system.

Even with these ballasts, patents and the patents cited in them there still remains a need for a simple and reliable means for providing dimming control for electronic and magnetic ballasts for fluorescent or HID lamps and which overcomes or at least minimizes many of the previously mentioned problems.

SUMMARY OF THE INVENTION

A power controller and method for controlling the switches of the power controller is described.

The power controller is a half bridge, pulse width modulated controller for an inductive load. The top half of the bridge is comprised of two switches, the top switch set, and the bottom half of the bridge is composed of two switches, the bottom switch set. Each switch also has a diode in parallel with it. The drivers for the switches are configured so that each of the switches can be turned on and off independently of all of all the other switches. Preferably, the controller is capable of operating in all four quadrants.

The method prevents timing mismatches in the switches from creating destructive modes in the power converter, such as shorts across the power source (shoot through) or voltage spikes, from cutting off current to the inductive load. The method at the most general level involves first switching one of the switches of one of the switch sets, then switching both switches of the other switch set, and finally switching the second switch of the first switch set. The first switch selected is based upon the quadrant that the controller is operating in.

In one embodiment the switching method is applied to a dimming controller for a lighting ballast. The duty cycle of the pulse width modulation sets the amount of dimming. The switches are comprised of IGBTs.

Each of the switches is controlled independently such that, in all four quadrants of operation, when the one of the switch sets changes states, the second switch set has one switch on and one switch off, so that diode associated with the off switch of the second switch set is disposed to block shoot through and provide a path to allow current to continue flowing in the inductive load.

DETAILED DESCRIPTION OF THE INVENTION

The present invention modulates the brightness of standard ballasted metal halide lights by adjusting the amplitude of the AC drive voltage delivered to the ballast. Drive frequency is maintained at 60 Hz for all output settings, although the invention can be used with any frequency input. The controller adjusts the output amplitude by varying the duty cycle of a high frequency switching bridge consisting of solid-state IGBT switch elements. The lighting control generates a full four-quadrant, AC waveform to properly drive the lighting ballasts.

In the current embodiment the AC power input is chopped at a high frequency. The duty cycle of the chopping determines the amount of dimming of the ballast. Dimming can preferably be from full power (100% duty cycle) to no power (0% duty cycle).

While in the current embodiment the switch elements are IGBTs, other types of power transistors, such as MOSFETS or bipolar transistors may be used including future invented power switching devices. The use of IGBTs herein is illustrative and not meant to be limiting. The term "switch" will be used to refer generically to any type of power transistor.

Typical sinewave and pseudo-sinewave output drive systems (such as variable frequency drives for electric motors) employ an AC-to-DC-to-AC conversion scheme where the mains AC voltage is first rectified and filtered onto a high capacity DC bus, then switched at a high frequency using pulse-width modulation techniques to reconstruct an AC output waveform with the desired frequency and voltage characteristics. In order to avoid the high costs and physical size of an AC-to-DC-to-AC conversion scheme, the invention described herein performs a direct AC-to-AC, transformerless conversion using a high-frequency buck regulator approach. Unlike standard buck regulators however, which normally operate as DC uni-directional converters, the active switch and the free-wheeling diode in this invention preferably support bi-directional voltages and currents.

To accomplish this direct AC-to-AC conversion it is essential that the switches seamlessly commutate the output current to avoid destructive overvoltage spikes caused by the inductive output filter circuit. Even small timing mismatches in the switches can result in cutting the path for current in the load inductor of the ballast. Since the voltage on the load is determined by the equation $V=L*di/dt$, where V is the voltage, L is the inductance, and $di/dt$ is the instantaneous change in current in the inductor. If the path for current is cut off very quickly due to timing mismatch in the switches, the voltage will spike with the result being destruction of a semiconductor switch. Put another way, as switches are turned on and off to reduce the duty cycle of the applied AC power, a path, either through an on switch, or through a diode, must be provided at all times so that the current in the load inductor of the ballast can continue to flow.

Figure 1:
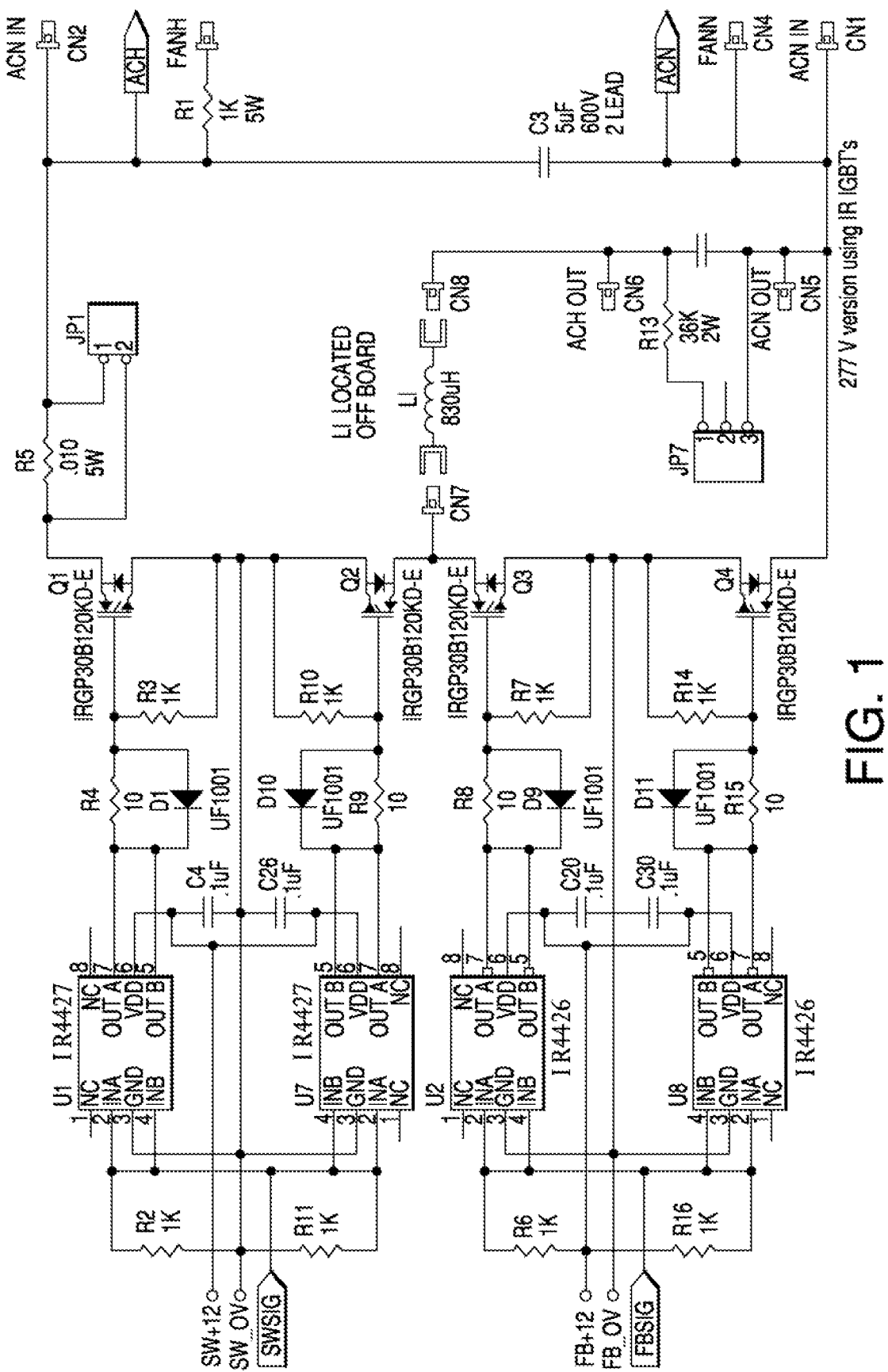
FIG. 1 outlines prior art for a standard bi-directional switching bridge circuit used to dim ballasted HID lamps.

FIG. 1 illustrates prior art for an AC-to-AC bi-directional switching bridge topology used to dim HID lamps. Q1 and Q2 switch together forming the upper bi-directional switch set. Q3 and Q4 switch together, forming the lower bi-directional switch set. As can be seen from the schematic, the upper and lower switch elements cannot be on at the same time; this would result in a short circuit of the AC mains input. This condition, also known as shoot through, would result in destruction of the transistors due to over current. The output inductor L1 places an additional constraint on the switch elements; one switch set must always be on while current is flowing in L1. If both switch sets turn off while L1 is conducting, the inductor can produce a overvoltage spike capable of destroying any or all of the IGBTs. Therefore the switch timing in the prior art design of FIG. 1 is over constrained; when one switch element turns off, the other must turn on at the exact same instant, with the exact same rise and fall times.

The bottom switch set in FIG. 1. Q3,Q4 is necessary for pulse width modulation so that when the top switch set Q1,Q2 turns off, the bottom stitch set can provide a path for current to continue flowing through the inductive load. The period of time when the top switch set is on and the bottom switch set is off is generally known as the charging period. The period of time when the bottom switch set is on and the top switch set is off is generally referred to as the discharge period or flyback period. In four quadrant applications it is necessary to make the top switch set of semiconductor switches and the bottom switch set of two semiconductor switches so that the diode associate with each semiconductor switch does not conduct unintentionally during any of the quadrants.

Note that in FIG. 1 while each power transistor Q1-Q4 has its own driver U1,U7,U2,U8 the inputs of the drivers for each switch set are tied together. SWSIG (scratch signal) is tied to the INA and INB of U1 and U7. Likewise FBSIG (flyback signal) is tied to INA and INB of U2 and U8. Thus Q1 cannot be switched independently of Q2 and Q3 cannot be switched independently of Q4.

Each set of switches will be referred to herein at a switch set. Thus the two switches in the upper half of the half-bridge are the top switch set and the two switches in the lower half of the half-bridge are referred to as the bottom switch set. Each switch set is comprised of two switches, an upper and lower switch. Thus with reference to FIG. 3, the top switch set is comprised of an upper switch, IGBT1, and a lower switch, IGBT2; the bottom switch set is also comprised of an upper switch, IGBT3 and a lower switch, IGBT4. A switch as referred to herein may refer to a FET (field effect transistor) including MOSFETs, a bipolar device, including NPN and PNP, an IGBT (insulated gate bipolar transistor) device, or any other power switching device.

Figure 3:
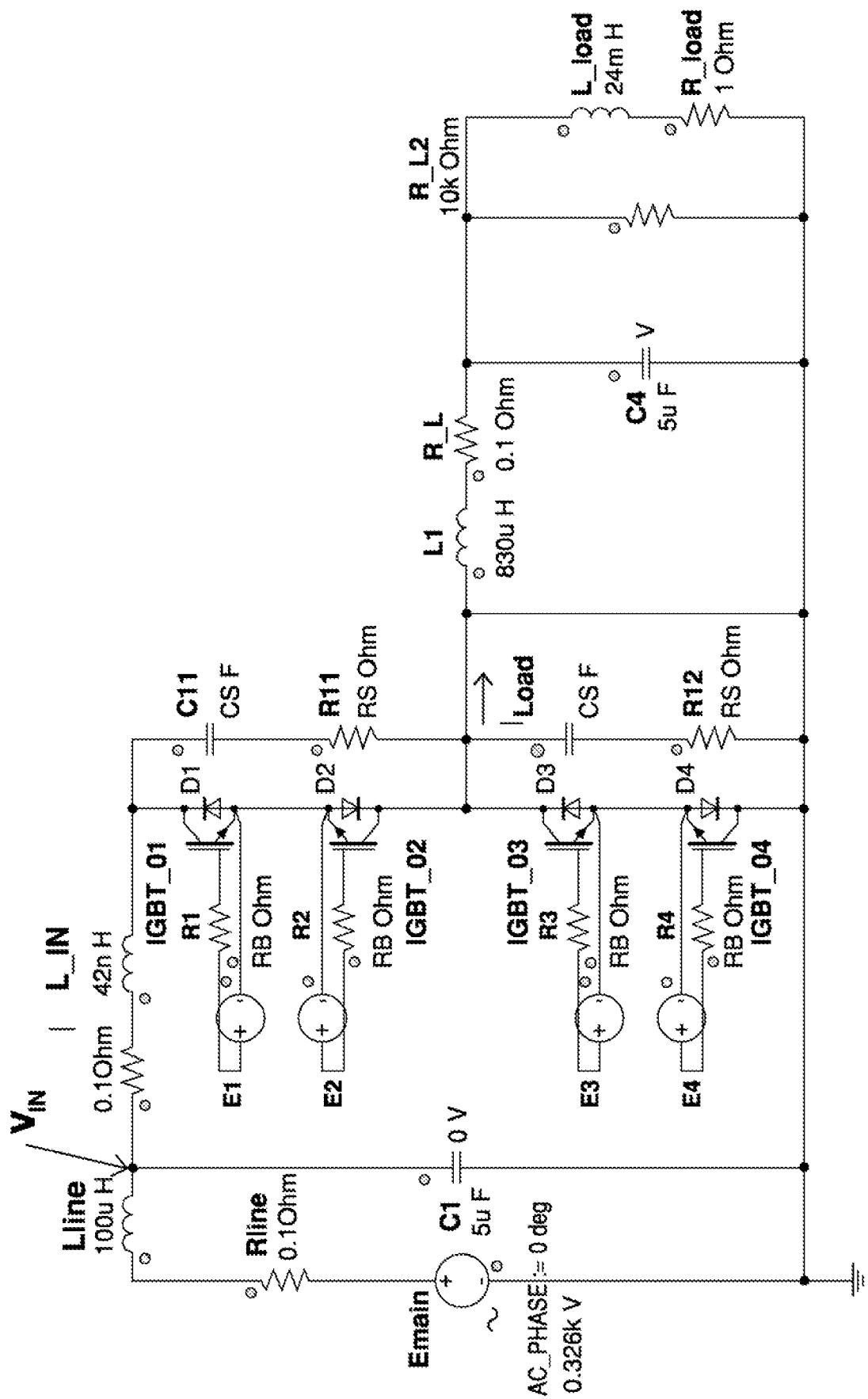
FIG. 3 is a schematic diagram of one implementation of the current embodiment.

It will be noted in FIG. 3 that each of the semiconductor switches IGBT1-IGBT4 also includes a diode D1-D4. This diode may be intrinsic, that is part of the semiconductor nature inherent in the device. An intrinsic diode is also referred to as a body diode and is found in MOSFETs. The diode may also be extrinsic. Extrinsic diodes may be added as separate components from the switch or they, may be integrated in to the same package as the switch (indeed onto the same silicon) by the semiconductor manufacturer. The term switch as used herein may refer to the device with or without the shown diode.

Figure 2:
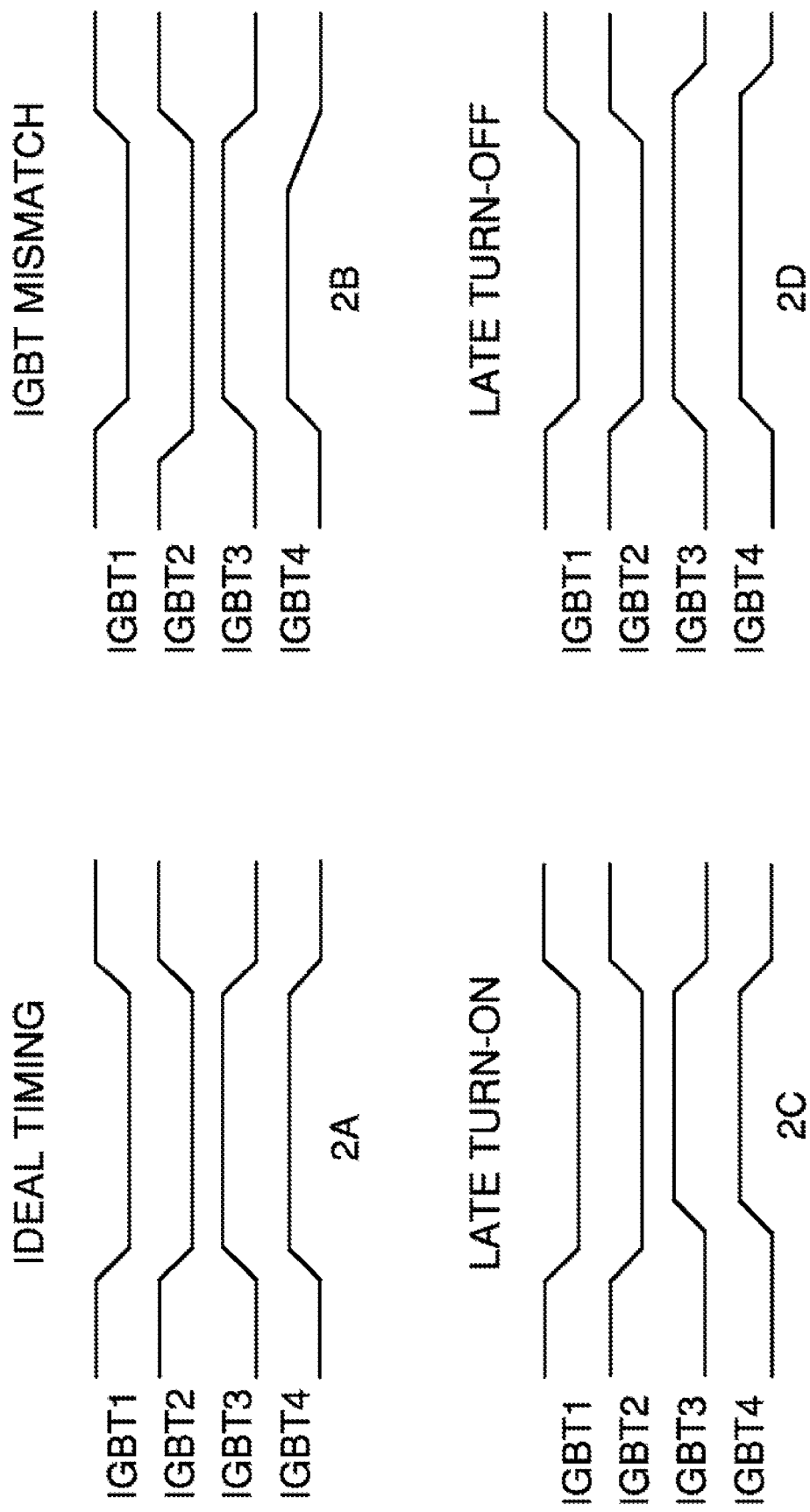
FIG. 2 shows the ideal timing condition required by the prior art for normal operation, and three timing error scenarios that could result in permanent damage to circuit components of the prior art example.

The topology of the AC power supply, the top and bottom switch sets and the load shown in FIG. 2 is referred to herein as a half bridge.

Typically the switch sets have been treated as single unit, with the upper and lower switches of each switch set being turned on and off together. While in theory, these switches can be turned on and off together, in practice each device has unique characteristics which cause it to turn on and off at slightly different times, even if a single signal is sent to switch them at the same time. FIG. 2 shows the timing condition required by this traditional switching arrangement for normal operation, and three timing error scenarios that could result in permanent damage to circuit components. FIG. 2A shows an ideal timing sequence where the bottom switches turn off at the exact same time that the top switches turn off and vice-versa. Timing, mismatches, as shown in FIG. 2B, can result in high voltage spikes across an IGBT that switches slower than its neighbors. FIG. 2C shows a 'late turn-on' scenario which results in all switch elements are off at the same time, causing L1 to generate a destructive overvoltage spike. FIG. 2D shows a 'late turn-off' scenario resulting in all switch elements are on at the same time, causing a short-circuit condition across the AC mains input also known as shoot through.

With reference to FIG. 3, the particular placement and values of the components are exemplary and are not meant to limit the scope of the claimed invention.

Traditional designs have gotten around these switch problems through a variety of techniques. One method is to slow the switching speed down to the point where the timing differences are negligible. This however results in greater switching losses and larger magnetics and larger components. Other techniques include adding additional capacitance and inductance into the design to absorb voltage and current spikes. Again, such techniques increase components and size of the controller as well as decrease its efficiency.

The present invention makes use of the fact that it is not necessary to treat a switch set as a single switch, and that each of the switches can be turned on or off separately and separately controlled.

The present invention avoids the over-constrained timing conditions of the prior art design by employing an active commutation sequence to transfer the load current, $I_{load}$, from one switch element to the other. The present invention accomplishes this by controlling all four IGBTs independently, rather than in fixed pairs, and actively selecting the correct IGBT gating, sequence based on the instantaneous directions of the input voltage and output current.

The schematic for the IGBT power conversion section of the present invention is shown in FIG. 3. The two bi-directional switch sets (top switch set IGBT1,2 and bottom switch set IGBT3,4) switch at a frequency significantly higher than the AC mains frequency. The symmetrical nature of the IGBT switch design allows for full four-quadrant operation between the load and the AC power line, under both resistive and reactive load conditions. Sources E1 thru E4 in FIG. 3 represent IGBT gate driver circuits capable of driving each IGBT independently.

With reference to FIG. 3, one skilled in the art may recognize that the places identified for $I_{load}$ and $V_{in}$ may not be exactly the same as the input voltage and load current. However for practical purposes they are very close and are convenient places to sense these values. These choices of sensing locations are exemplary and not meant to limit the invention.

Figure 4:
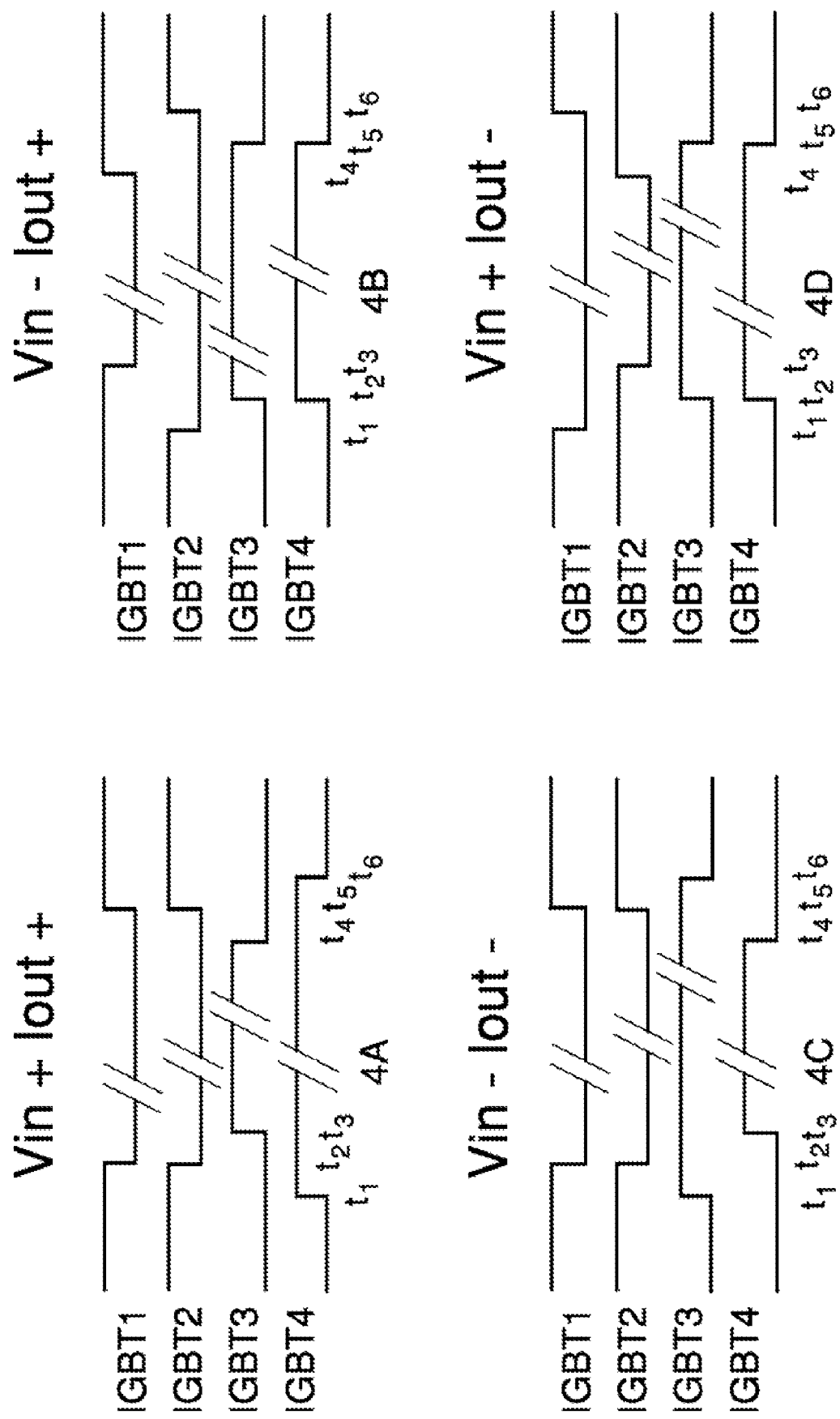
FIG. 4 describes four commutation sequences used to achieve active commutation in the switching elements IGBT1-4 of FIG. 3.

A switching control circuit directs the active switch commutation by firing the IGBTs in the proper sequence, based upon instantaneous input voltage $V_{in}$ and output current $I_{load}$ measurements made at the points indicated in FIG. 3. There are four prescribed sequences one for each quadrant of operation, covering all possibilities of input voltage polarity and output current direction. FIG. 4 describes the four commutation sequences, shown switching from the IGBT1-2 group to the IGBT3-4 group and then back again.

The term quadrant refers to the polarity of the voltage of the input power source, $V_{in}$ and the load current, $I_{load}$. Since $V_{in}$ can be positive or negative and $I_{load}$ can be positive or negative, there are four possible combinations of the states of Vin and $I_{load}$, thus forming four quadrants: $V_{in}+$, $I_{load}+$; $V_{in}+$, $I_{load-}$; $V_{in}-$, $I_{load}+$ and $V_{in}-$, $I_{load}-$.

With respect to FIG. 3 reference to the switches or switch sets being connected to input voltage or load does not mean that they are directly connected. As can be seen in FIG. 3 other components or line impedances may exist between the switches, the input and output.

The basic strategy is the same for each of the four commutation sequences. First, one of the four IGBTs is either turned on or off in order to provide a diode of the correct polarity for commutation. Next, the opposing switch set is completely turned on or off, since the current can now freely commutate between the opposing switch and diode. Finally the IGBT across the diode is turned on or off to fully commutate the output current to the opposing switch set. The terms "switching state" or "changing state" or "switching" means turning a switch or switch set that is on (conducting) to off (not conducting) or vice versa.

Within each of the switch sets it should be noted that the diodes of the individual switches are asymmetrical against each other (the anodes face each other). In this manner, current can never run through both diodes of a switch set. If both switches are on in a switch set, current will not run through either diode. If one switch is on and the other off, current can run through the diode of the off switch if the voltage of the anode is sufficiently higher than the cathode voltage. Thus whether a diode conducts or blocks current depends upon whether its associated switch is on or off (other than leakage current a diode does not conduct when its switch is on since the switch provides a lower impedance path for current) and what the voltage across the diode is (which is determined by the quadrant the controller is operating in). Each diode conducts only when there is a positive voltage from anode to cathode.

As can be seen in FIG. 4, each switching action is made up of the three distinct switching events described below separated by two delay periods. Note that these delay periods are not time critical as in the prior art example of FIG. 2, and only need to be as long as the worst case switching delay times of the IGBTs. There is no maximum delay time constraint; therefore there is no race condition that could produce shoot-through currents or over-voltage spikes.

The goal in each quadrant is to turn the top switch set off (to stop charging the inductive load) while turning the bottom switch set on (to allow current to continue circulating through the load during discharge period) and later to switch them back. In general the switching mechanism of FIG. 4 is done as follows:

At t1 switching one switch of a switch set so that the switch within that switch set that has the anode of its associated diode facing positive voltage is on. This leaves the switch off that has an associated diode that will act as a blocking diode to prevent shoot through. That same diode of the off switch will also conduct current if necessary to allow current to continue flowing in the load.

At t2 the state the opposite switch set is changed by switching on or off both of the switches in that opposite switch set.

At t3 the switch of the first switch set that has the anode of its associated diode facing negative voltage is turned on.

Then at t4 through t6 the states of each switch are reversed again in opposite order. Put another way, before switching, one of the switch sets has its switches configured such that the diodes block shoot through and allow flywheel conduction through one of its diodes. The first switch to switch is determined by the polarities of $V_{in}$ and $I_{out}$. If $V_{in}$ and $I_{load}$ are the same polarity, switching begins with one of the switches of the lower switch set. If $V_{in}$ and $I_{load}$ are the opposite polarity, switching begins with one of the switches of the upper switch set.

With respect to the switch set whose switches are switched at t2, the two switches may conveniently, but not necessarily, be switched at approximately, the same time. They can be switched at separate times so long as they are both done switching before t3.

While this may be difficult to understand when generalized, it should be readily understood by example. In FIG. 4A the timing is shown for the quadrant where $V_{in}$ and $I_{load}$ are positive. At t1 IGBT4 is turned on (this is the switch of the bottom switch set who's associated diode D4 is positive on its anode). Once IGBT4 is on, three of the four switches are on, IGBT1,IGBT2,IGBT4, but shoot through does not occur because IGBT3 is off and IGBT's associated diode D3 is oriented as a blocking diode to the positive voltage of $V_{in}$. At t2, the upper switch set, IGBT1 and IGBT2 are both turned off. If there was no path for current to flow through, there would be a destructive voltage spike from the load inductance. However since IGBT4 is on, current can continue to flow from load and recirculate back to the load (flywheel or flyback) through the path created by IGBT4 which was already on (since t1) and the diode D3 of IGBT3. Finally, by t3, since the top switch set is off it is safe to turn to IGBT3 without danger of shoot through, allowing current to continue to flow through both IGBT3 and IGBT4.

During the time between t3 and t4 the top switch set is off and the bottom switch is on. During this time the power source is not charging the inductive load and the load current is recirculating through the lower switch set. The longer this period of time between t3 and t4 the longer the power to the load is "off" and the shorter the duty cycle of the pulse width modulation. Preferably, the turn-on and turn-off time of the switches are sufficiently fast that the time between t1 and t3 (and between t4 and t6) is much shorter than the time between t3 and t4.

Still with reference to FIG. 4A, by t4 it is desirable to switch the bottom switch set off and the top switch set back on. At t4, IGBT3 is turned off. Current can continue to flow out of the load and recirculate back to the load through IGBT4 (which is still on) and the diode D3 of IGBT3. Then the upper switch set is turned back on at t5 but no shoot through occurs because the diode D3 of IGBT3 prevents this shoot through. Finally, at t6 IGBT4 is turned off.

Figure 5:
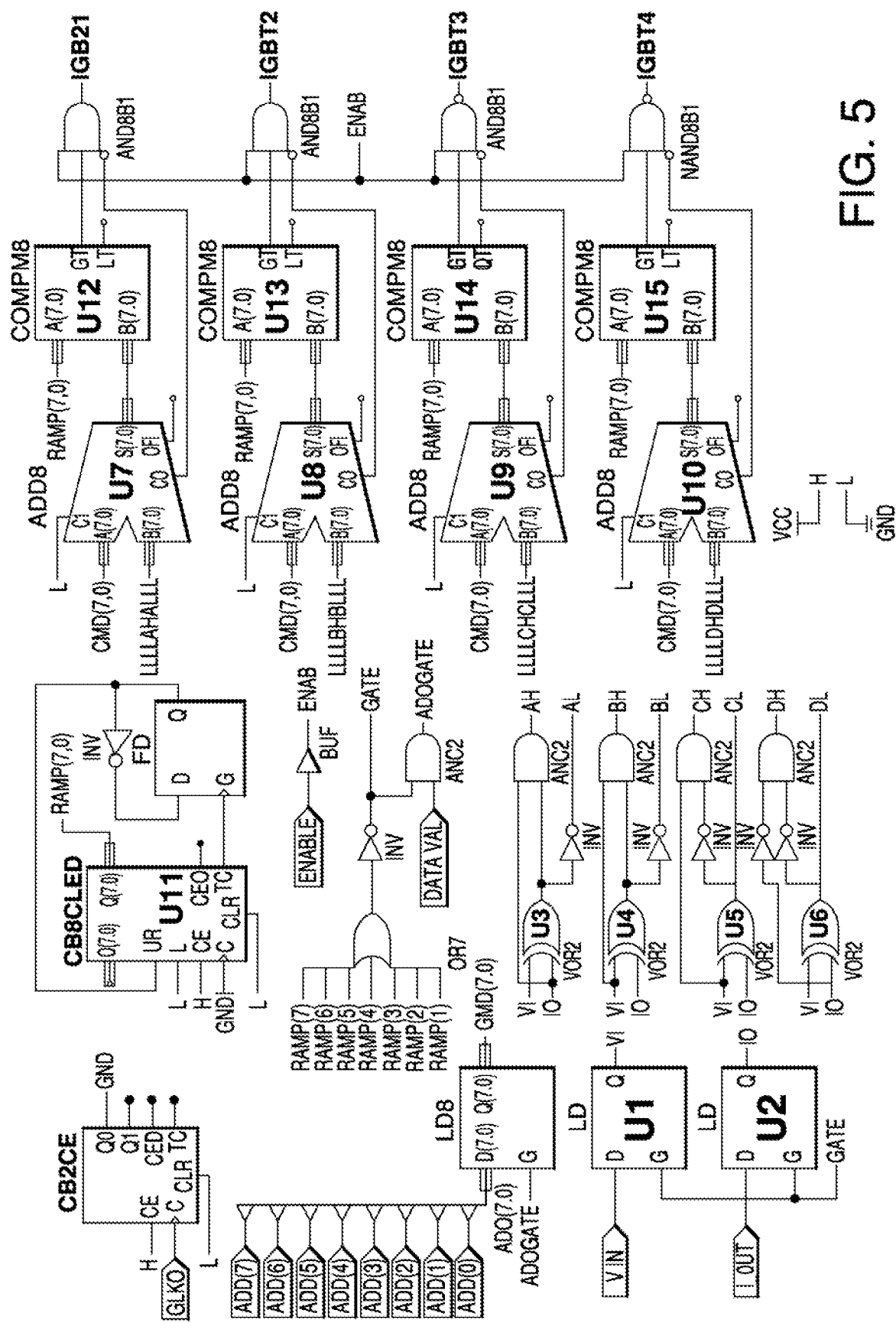
FIG. 5 is a schematic of a circuit that can be used to implement the commutation of FIG. 4.

A practical method for implementing this commutation sequence control is shown in the logic diagram of FIG. 5. This figure is exemplary and not meant to limit the invention. The same control sequence could be implemented with different logic, in software, or in a ROM. Note that the logic elements used in this diagram are standard library elements that are supported by a number of commercial programmable logic devices. Two binary signals representing the polarity of the input voltage and output current are applied to V_IN and I_OUT inputs in the lower left-hand corner of the diagram, respectively. U1 and U2 are gated latches that capture the polarity values at the beginning of the commutation sequence, U3 thru U6 form a logic encoder that generates the timing offset values AH:AL, BH:BL, CH:CL, and DH:DL, which are added to the four IGBT switching commands at the L3 input port of the 8-bit summing elements U7 thru U10. The 8-bit value applied to the N input ports is a latched version of the input command value at ADC>0:7>. This command value sets the overall duty cycle of the converter with 11111111 representing full output. U11 is an 8-bit up-down counter that generates a digital value representing a uni-polar, triangular waveform at the desired PWM frequency. The 8-bit magnitude comparators at U12 thru U16 compare the ramp signal to the offset command values from U7 and U10 and generate the four IGBT command signals Q1 thru Q4, sequenced properly according to the V_IN and I_OUT inputs.

Eliminating the critical switch timing constraints of the prior art allows the present invention to use components with standard tolerances, and avoid expensive post-assembly hand adjustments of the switch timing. This allows the lighting controller product to be practically and economically mass-produced, and reliably implemented in environments with adverse temperature and humidity variations. This timing algorithm can be encoded into a single programmable logic device, allowing the controller design to be both reliable and cost-effective.

The practical frequency range for this active commutation design has an upper limit of about 60 kHz, governed by the switching losses of commercial IGBTs at the present time. The practical lower frequency limit is determined by growing output inductor size and cost. A reasonable tradeoff of inductor size vs. switching losses is about 20 kHz.

The present invention improves on the prior art by the addition of an overvoltage breakdown device. An example of such a device is D6 and D7, shown in FIG. 6 connected to each IGBT collector terminal. This protects each IGBT against over-voltage transients by firing the IGBT automatically if the collector voltage exceeds about 75% of its maximum Vce rating.

Figure 6:
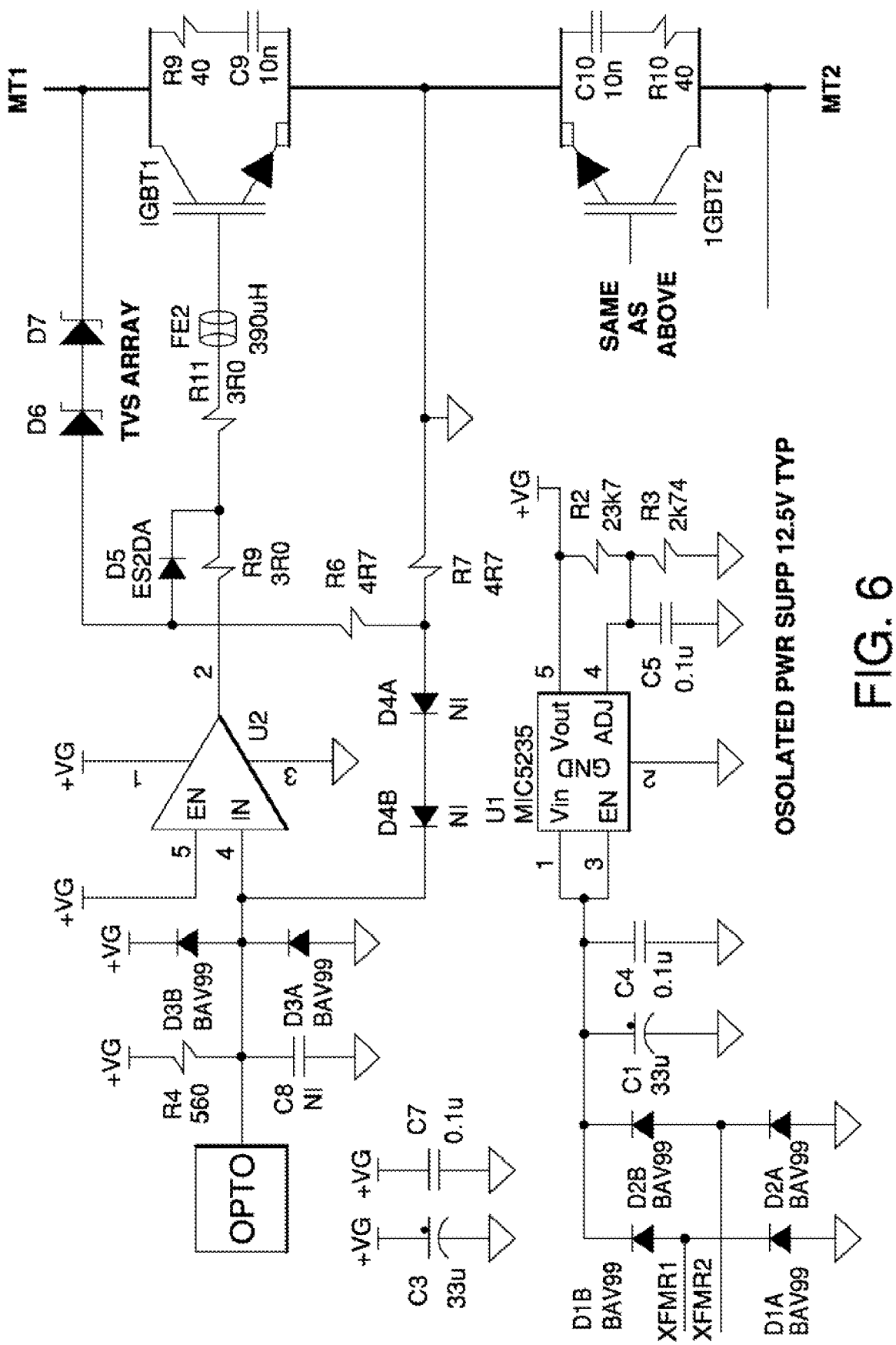
FIG. 6 is a detailed schematic diagram of a gate driver circuit that provides an over-voltage protection feature for each IGBT.

A detailed diagram of each gate driver circuit is shown in FIG. 6. Each gate driver section has independent opto-couplers, drivers and over-voltage protection, but both gate drivers for either bi-directional switch can use a common isolated power supply.

Lamp flicker is a common and significant problem with HID lamp dimming circuits. Low amplitude lamp flicker presents a visible annoyance, and at higher levels it can actually extinguish the lamp arc, resulting in a long recovery time. A significant source of lamp flicker is broadband noise induced on the command signal line to the dimming controller by radio transmitters and high power AC loads. The present invention improves lamp flicker performance considerably with the addition of a digital 'rolling average' algorithm. The control circuit continuously samples and digitizes the command input voltage signal and takes the average of 255 samples cover the period of one AC line cycle to determine the lamp dimming level. This rejects to first order the effects of induced line currents, and frequencies above.

It will be obvious to those skilled in the art of power electronics that while the switching methodology of the present invention is applied to pulse width modulation of a lighting ballasts the same methodology can be applied to any inductive load, such as a power supply or motor and such applications are within the scope of the present invention.

It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

What is claimed is:

1. A method of switching power in a controller for pulse width modulation of an inductive load comprised of:
   providing a power controller with a first switch set and second switch set, each of said switch sets further comprised of two power switches and each of said power switches having a diode associate with it;

first switching one of the switches of the first switch set;

then switching both switches of the second switch set;

then switching the second of the switches of the first switch set;

then waiting for a period of time related to the desired duty cycle of the pulse width modulation;

then switching the second of the switches of the first switch set;

then switching both switches of the second switch set; and then switching the first of the switches of the first switch set.

2. The method of claim 1 wherein the switches are IGBTs.

3. The method of claim 1 wherein the switches are MOSFETs or bipolar transistors.

4. The method of claim 1 wherein the associated diode for each switch is an intrinsic diode.

5. The method of claim 1 wherein the associate diode for each switch is an extrinsic diode.

6. The method of claim 1 wherein the inductive load is a lighting ballast.

7. The method of claim 1 wherein the inductive load is power converter or motor.

8. The method of claim 1 wherein the pulse width modulation is switched at a rate below approximately 60 khz.

9. The method of claim 1 wherein the first switch set is the bottom switch set when the input voltage and load current are of the same polarity.

10. The method of claim 1 wherein the first switch set is the top switch set when the input voltage and load current are of opposite polarity.

11. The method of claim 1 wherein when switching both switches of the second switch set the two switches that comprise the second switch set are switched simultaneously or switched separately.

* * * * *